United States Patent [19]

Hein, III et al.

[11] Patent Number: 5,542,529
[45] Date of Patent: Aug. 6, 1996

[54] HIGH BARRIER PACKAGES FOR SMOKING ARTICLES AND OTHER PRODUCTS

[75] Inventors: Carl C. Hein, III, Winston-Salem; Matthew S. Koschak, Pfafftown; Mark S. Powell, Winston-Salem; Peter P. Shearer, Bethania; Milly M. L. Wong, Winston-Salem, all of N.C.

[73] Assignee: R. J. Reynolds Tobacco Company, Winston-Salem, N.C.

[21] Appl. No.: 363,487

[22] Filed: Dec. 23, 1994

Related U.S. Application Data

[63] Continuation of Ser. No. 956,570, Oct. 5, 1992, abandoned, which is a continuation of Ser. No. 525,373, May 17, 1990, abandoned, which is a continuation-in-part of Ser. No. 513,520, Apr. 23, 1990, abandoned.

[51] Int. Cl.⁶ ........................................ A24F 15/00
[52] U.S. Cl. ..................... 206/245; 206/273; 206/274
[58] Field of Search ................................ 206/242, 245, 206/271, 273, 484, 274; 428/203, 204, 349, 458, 45.3, 352

[56] References Cited

U.S. PATENT DOCUMENTS

| | | |
|---|---|---|
| 1,117,015 | 11/1914 | Falk . |
| 1,702,325 | 2/1929 | Sickela ................................ 53/432 |
| 1,973,391 | 9/1934 | Reynolds . |
| 2,026,239 | 9/1934 | Luckett . |
| 2,112,523 | 3/1938 | Daller ................................ 206/274 X |
| 2,124,231 | 7/1938 | Kittredge et al. . |
| 2,152,398 | 3/1939 | Chalmers . |
| 2,874,891 | 2/1959 | Kelsall ................................ 229/136 |
| 3,135,459 | 6/1964 | Sherrill . |
| 3,237,843 | 3/1966 | Reed et al. ................................ 206/633 |
| 3,265,287 | 8/1966 | Hovland ................................ 206/264 |
| 3,278,016 | 10/1966 | Conti ................................ 206/274 |
| 3,301,468 | 1/1967 | Staley ................................ 229/87.3 |
| 3,333,683 | 8/1967 | Scharre ................................ 206/245 |
| 3,438,566 | 4/1969 | Mahon ................................ 206/626 |
| 3,606,139 | 9/1971 | Arscott . |
| 3,859,110 | 1/1975 | Foster et al. . |
| 3,952,868 | 4/1976 | Muller et al. . |
| 4,166,973 | 9/1979 | Lily, Jr. et al. . |
| 4,180,201 | 12/1979 | Focke ................................ 229/DIG. 9 |
| 4,225,040 | 9/1980 | Focke et al. . |

(List continued on next page.)

FOREIGN PATENT DOCUMENTS

| | | |
|---|---|---|
| 217523 | 9/1986 | European Pat. Off. . |
| 2206118 | 1/1971 | Germany . |
| 3632376 | 3/1988 | Germany . |
| 311565 | 3/1976 | Japan . |
| 140030 | 8/1982 | Japan . |
| 37726 | 9/1987 | Japan . |

OTHER PUBLICATIONS

Packaging Technology, Metallized Film Laminations Offers Bright Future for Board Converters (Sept. 1983).
European Search Report, Jul. 2, 1991, EP 91 10 6395, 2 pages.

*Primary Examiner*—Jacob K. Ackun

[57] ABSTRACT

A high barrier sealable packaging material and a high barrier heat sealed package for smoking articles, such as cigarettes and the like, are disclosed. The packaging material comprises a base layer of a polymeric film, such as a biaxially oriented polyethylene terephthalate (PET) film which has been metallized on one surface thereof with a layer of metal, such as aluminum. The metallized film is then imprinted with ink with a design and/or printed matter on either the metallized or unmetallized surface. Subsequently to or concurrently with the printing, a heat seal layer is applied to the printed and/or unprinted surface for forming a heat seal about which the material is wrapped. In one embodiment, the high barrier packaging material is used as an overwrap for a cigarette package having a tear tape for removing one end of the overwrap. In another embodiment, the high barrier packaging material is used as an overwrap for a carton containing a plurality of cigarette packages and having a tear tape for removing one end of the carton overwrap.

20 Claims, 2 Drawing Sheets

U.S. PATENT DOCUMENTS

| | | |
|---|---|---|
| 4,267,094 | 5/1981 | Huhn et al. . |
| 4,286,712 | 9/1981 | Focke . |
| 4,293,068 | 10/1981 | Focke et al. ............... 206/264 |
| 4,300,676 | 11/1961 | Focke et al. ............... 206/264 |
| 4,303,155 | 12/1981 | Focke et al. . |
| 4,343,852 | 8/1982 | Isaka et al. . |
| 4,344,998 | 8/1982 | de Leeuw et al. . |
| 4,363,851 | 12/1982 | Mishina et al. ............... 428/333 |
| 4,493,872 | 1/1985 | Funderbunk et al. ............... 428/332 |
| 4,508,218 | 4/1985 | Focke et al. . |
| 4,522,887 | 6/1985 | Koebisu et al. . |
| 4,599,275 | 7/1986 | Hayashi et al. . |
| 4,604,322 | 8/1986 | Reid ............... 428/349 X |
| 4,702,963 | 10/1987 | Phillips et al. ............... 428/35.3 X |
| 4,704,325 | 11/1987 | Crocker ............... 428/349 X |
| 4,720,423 | 1/1988 | Fraser ............... 428/313 |
| 4,741,957 | 5/1988 | Park ............... 428/349 |
| 4,776,461 | 10/1988 | Focke et al. ............... 206/271 |
| 4,789,060 | 12/1988 | Focke et al. ............... 206/274 |
| 4,800,903 | 1/1989 | Ray et al. ............... 131/273 |
| 4,807,745 | 2/1989 | Langley et al. ............... 206/245 |
| 4,818,609 | 4/1989 | Schmoock ............... 428/336 |
| 4,836,378 | 6/1989 | Lephardt . |
| 4,862,680 | 9/1989 | Krah . |
| 4,862,809 | 9/1989 | Krah . |
| 4,880,695 | 11/1989 | Rudd et al. ............... 428/341 |
| 4,883,698 | 11/1989 | Bothe et al. ............... 428/349 X |
| 4,971,863 | 11/1990 | Hast ............... 428/458 |
| 4,996,096 | 2/1991 | Dew ............... 428/349 X |

HIGH BARRIER PACKAGES FOR SMOKING ARTICLES AND OTHER PRODUCTS

CROSS-REFERENCE TO RELATED APPLICATION

This is a continuation of Ser. No. 07/956,570 filed Oct. 5, 1992, and now abandoned, which is a continuation of Ser. No. 07/525,373, filed May 17, 1990, and now abandoned, which is a continuation-in-part of Ser. No. 07/513,520, filed Apr. 23, 1990, and now abandoned.

FIELD OF THE INVENTION

The present invention relates to high barrier heat sealed packages especially for smoking articles, such as cigarettes, and for other products and to a high barrier heat sealable packaging material.

DESCRIPTION OF THE PRIOR ART

Popular smoking articles such as cigarettes have a substantially cylindrical rod shaped structure and include a charge of smokable material such as shredded tobacco (e.g., cut filler) surrounded by a paper wrapper thereby forming a so-called "tobacco rod." It has become desirable to manufacture cigarettes having cylindrical filter elements aligned in an end-to-end relationship with the tobacco rod. Typically, filter elements are manufactured from fibrous materials such as cellulose acetate and plug wrap, and are attached to the tobacco rod using a circumscribing tipping material. Such cigarettes having filter elements are referred to as "filter cigarettes."

Filter cigarettes conventionally have been sold in packages, each package normally containing twenty (20) cigarettes. Typical cigarette packages have a generally rectangular parallelepiped form. One type of popular cigarette package employs a container having the form of a so-called "hard pack," "crush proof box" or "hinged lid package." Another type of popular cigarette package employs a container having the form of the so-called "soft pack." Both types of cigarette packages are normally packed in cartons also of generally rectangular parallelepiped form, typically ten (10) packages to a carton.

The aforementioned types of conventional cigarette packages are designed to maintain the freshness and moisture content of the cigarettes and to protect the cigarettes from adverse environmental conditions which could degrade the freshness and quality of the cigarettes. Such conventional cigarette packages typically comprise three separate wrappings: (1) an inner foil liner comprising a metal foil laminated to a paper substrate or a metallized paper which is wrapped about the cigarettes and folded, but not sealed, at the ends of the cigarettes; (2) a "soft" or "hard" paper or paperboard package which is usually imprinted with brand specific information; and (3) an exterior clear overwrap of a heat sealable polymeric film polymeric film which is heat sealed.

A strip of polymeric material known as a "tear tape" is provided for easy opening of the polymeric overwrap films. The tear tape is positioned adjacent and parallel to the top edge of the package. One end of the tear tape normally projects slightly from the package as a tab. To open the package, the tab is pulled by the smoker to open the polymeric overwrap. In particular, the projecting tab of the tear tape is pulled to slit the polymeric overwrap along both edges of the tear tape and the polymeric overwrap covering the top of the container is removed. The top of the package is then opened, i.e., the foil inner liner is torn open in the case of the soft pack or the hinged lid of the hard pack is pivoted open and a portion of the foil inner liner is removed to expose the ends of the cigarettes contained therein. The smoker then grasps the end, usually the filter end, of a cigarette with his/her fingers to remove it from the package.

Typically, the polymeric overwrap material comprises an oriented polypropylene (OPP) which may be (a) a heat seal modified oriented polypropylene, (b) an acrylic heat seal coated polypropylene, or (c) a coextruded ABA type OPP film wherein the A layers are fusion heat sealable polypropylene/polyethylene copolymer and the B layer is an oriented homopolymer of polypropylene. The composition of the heat seal layers is selected to optimize the heat sealing characteristics of the overwrap, i.e., the lowest practicable heat seal temperature and the shortest practicable dwell time. At the same time, however, the heat seal layer of the overwrap normally provides the necessary slip or antistick characteristics so that overwrapped cigarette packages readily slip or slide relative to one another during the manufacturing process and during dispensing of the cigarette packages, for example, for a cigarette vending machine. Accordingly, selection of the heat seal layer composition is essentially a trade off between optimum heat seal characteristics and optimum slip characteristics.

Under normal storage conditions and normal shelf life, the conventional cigarette package described above is capable of maintaining the freshness and moisture content of the cigarettes at an acceptable level for a limited period of time. However, if the cigarette packages are exposed to a longer than normal shelf life, or if the cigarette packages are stored in unusually hot and/or dry atmospheric conditions, the conventional package does not adequately preserve the freshness and moisture content of the cigarettes. In particular, the foil inner liner of the conventional cigarette package has a primarily decorative purpose inasmuch as the paper-backed foil liner is only overlapped at its longitudinal seam and folded over on the top and bottom of the package without sealing. Thus, the foil inner liner provides little or no barrier to the passage of oxygen and moisture between the cigarettes in the pack and the surrounding atmosphere. While the barrier effectiveness of the conventional heat sealed OPP overwrap is significantly greater than the conventional foil inner liner, the conventional overwrap does permit loss of moisture and flavor over a period of weeks so that the consumer can ascertain a change in the freshness of the product. If an extended shelf life or storage under adverse temperature and humidity conditions is encountered, there can result a staleness of the tobacco, a moisture loss, and a loss of tobacco flavor or aroma, including a loss of flavor additives, such as menthol.

The carton in which the individual cigarette packages of twenty cigarettes are packaged (typically ten packages to a carton) is a folded paperboard container loosely tacked together with adhesive and provides substantially no barrier protection. Cigarette cartons intended for domestic consumption are normally not provided with a carton overwrap, however, cartons intended for export are further wrapped with a heat sealed OPP overwrap because the shelf life between manufacture and consumption of the export product is typically longer than the shelf life for the domestic product.

Various packaging overwraps and inner liners have been proposed for improving the barrier properties of cigarette packages. For example, U.S. Pat. No. 3,948,389 to Molins et al. discloses an air impervious inner liner for a cigarette package wherein an air impervious tube is sealed flat with the resulting margin and triangulated ends being folded against the packet. Because of the resulting unusual end flap structure, the packages cannot be sealed by current cigarette package manufacturing equipment.

U.S. Pat. No. 4,375,260 to Focke et al. discloses a laminated foil inner liner which, as in the case of the aforementioned Molins et al. patent, has an unusual end flap structure and cannot therefore be made by conventional cigarette packaging equipment. In addition, the Focke et al. inner liner has an easy opening preperforated feature which can result in severing of the impervious foil layer thereby reducing the barrier properties of the inner liner.

U.S. Pat. No. 4,807,745 to Langley et al. is assigned to the assignee of this invention, and discloses a barrier heat sealed package for cigarettes. The package material comprises a relatively thick laminate made of a foil layer to which two layers of biaxially oriented polypropylene homopolymer are adhesively bonded on opposite sides and exterior and interior surface layers of a heat sealable thermoplastic polymer are applied. This laminate is disclosed as being useful as an overwrap for a soft or hard pack or as a sealed inner liner for a soft or hard pack. Although the package overwrap laminate disclosed by Langley et al. is between about 1.5 to about 2.5 mils, it is substantially compatible with conventional cigarette packaging equipment and has an external appearance comparable to conventional cigarette packages.

It would be desirable to provide a heat sealable high barrier cigarette package overwrap or a cigarette carton overwrap of a gauge equal to or less than that of the conventional OPP overwrap for packages and export cartons. Such as overwrap desirably would preserve the freshness and moisture content of the cigarettes contained in the package or carton, thus, minimizing changes which might be detected by the consumer after passage of the normal period of time between cigarette manufacture and consumption. In addition, such as overwrap could increase the normal shelf life of the cigarettes or maintain a shelf life equal to or greater than normal shelf life under the most adverse storage conditions. Advantageously, such a cigarette package or carton would also be compatible with existing cigarette manufacturing and packaging equipment to the extent that major modifications of that equipment are not required to maintain production rates at least equal to present rates of cigarette package and carton production. In addition, it would be desirable to provide a high barrier cigarette package that has an external appearance at least comparable to conventional cigarette packages and also that may be opened in the same way as a conventional cigarette package. It would also be desirable to provide a high barrier cigarette package that has slip characteristics equivalent to or better than conventional cigarette packages.

SUMMARY OF THE INVENTION

The present invention provides a high barrier heat sealed package for smoking articles, such as cigarettes, cigars, cigarillos and the like, and a heat sealable barrier packaging material. In the embodiments show, the package overwrap is wrapped about a cigarette package or cigarette carton having a rectangular parallelepiped shape with an overlapping longitudinal side seam and overlapping top and bottom folded end flaps and heat sealed in substantially the same locations as a conventional cigarette package overwrap or an export carton overwrap. Alternatively, an overlapped seam can be provided on the top or bottom of the package and folded flaps can be provided and heat sealed on the sides of the package. The package overwrap of the invention is also suitable for wrapping cigarette packages or cartons having shapes other than a rectangular parallelepiped, including, for example, cylindrical or polyhedral shapes.

Although the barrier packaging material disclosed herein is especially useful in the packaging of smoking articles, it is also useful in packaging other articles or products, particularly those that are packaged in rectangular parallelepiped containers. Examples of other products that may be advantageously packaged according to the invention are chewing tobacco and pipe tobacco, the freshness and moisture content of which is desired to be maintained.

The barrier packaging material according to the invention comprises a base layer of a polymeric film, preferably a biaxially oriented heat-set polyethylene terephthalate film (PET) having a thickness of about 0.25 mils to about 1.25 mils which has been metallized by conventional vacuum deposition techniques with a layer of metal, preferably aluminum, having a thickness which will provide an optical density of about 1.5 to 3.0. The polyester film layer may have either a glossy surface finish or a matte finish so that after metallization with aluminum, the glossy surface film has a bright, shiny and highly-reflective surface and the matte finished film provides a soft, satin-like, low-reflectance surface. After metallizing, the PET film is wound onto rolls in preparation for printing.

The base layer may also be an oriented polypropylene single layer or coextruded film having a thickness of about 0.75 mils to about 1.25 mils or an oriented nylon film having a thickness of about 0.50 mils to about 1.0 mils. These materials are characterized by relatively high tensile and tear strengths and, when vacuum metallized with aluminum to the thickness described above for the PET film, have barrier properties substantially better than the conventional cigarette package overwrap.

The metallized base layer is then imprinted with a repeat design and/or other matter, e.g., brand specific information, directly on either the metallized or the non-metallized surface of the layer. Preferably, the metallized surface is protected so as to provide abrasion resistance for the metal coating. Depending upon the ink formulations used, it may be necessary to prime coat the surface of the base layer with an adhesion promoting material, such as polyethylene amine (PEI). Transparent, metallic filled and/or opaque printing inks are preferably applied by conventional printing techniques, such as the rotogravure or flexographic processes. Of particular advantage is the use of transparent printing ink which permits the reflectivity of the metallized surface to be apparent through the printing ink and thereby provides attractive and differentiating presentations of both the graphics and the packaging materials. Inks utilizing polyester resin systems are preferred for their adhesion and physical resistance characteristics, however, ink systems based on nitro-cellulose or polyamides can also be utilized.

After printing, or simultaneously with the printing of the designs, graphics, etc., a heat seal layer is applied to the printed and/or unprinted surfaces of the metallized film. In the preferred embodiment, a clear heat seal is applied in a predetermined repeat pattern on both surfaces of the metallized PET film, i.e., on the printed side and on the opposite unprinted side, at locations adjacent the side edges and along a transverse strip corresponding respectively to the top and bottom folded flaps and the longitudinal overlapped seam of the package overwrap. In certain embodiments of the invention, the heat seal layer may be applied to the entire surface of one or both sides of the metallized polymeric film.

The heat seal layers are preferably clear (but may also be translucent or opaque) thermoplastic materials having optimum hot tack characteristics and minimum sealing temperatures in the range of about 195° F. to about 275° F. Thermoplastic materials suitable for use as the heat seal layer include condensation polymers formed from ethylene glycol and terephthalic acid (PET); copolymers of ethylene and vinyl acetate with vinyl acetate ranges of 4.5% to 28% (EVA); vinyl coatings formed from a free radical additional reaction of vinyl acetate and various vinyl monomers, acrylate esters, vinyl chloride, vinylidene chloride, dibutyl and other dialkyl maleates and other commercially available comonomers; polymers derived from the polymerization of a carboxylic acid monomer and ethylene reacted with sodium, potassium or zinc (ionomer); or a dispersion of modified polypropylene in a high boiling aliphatic hydrocarbon. The application weight of the heat seal polymers can range from 1.0 to 6.0 pounds per 3000 square feet of base layer (assuming application to one entire surface of the base layer) and provides heat seal width when pulled on an Instron according to conventional seal strength testing procedures.

The preferred heat sealant is a polyester thermoplastic applied at a weight of 1.0 to 3.0 pounds per 3000 square feet (assuming application to an entire surface of the base layer) which provides a seal strength of about 3.0 pounds per inch of seal width over a sealing temperature range of from about 210° F. to about 375° F. One important advantage of applying a heat seal layer to the overwrap film in a registered pattern rather than as a skin layer completely covering both sides of the overwrap film is that the slip characteristics of the overwrap of the invention will not be adversely affected by the composition of the heat seal layer, but will depend on the slip characteristics of the printed surface of the overwrap film. After printing and application of the heat seal layer or pattern, the metallized PET film is cut to width and subsequently wound onto rolls suitable for use in a machine for forming a cigarette package or carton overwrap.

The package overwrap material comprising the printed metallized PET film with the registered heat seal layer pattern applied is used in conventional cigarette packaging apparatus to overwrap "soft packs" or "hard packs" of cigarettes with a conventional tear tape. Each printed overwrap is cut from the roll, wrapped about a soft or hard pack over a tear tape and heat sealed along its longitudinal seam at the transverse heat seal strip. The top and bottom end flaps are then folded over and heat sealed to form an opaque, high barrier cigarette package which has a substantially extended shelf life over conventional cigarette packages with a clear polypropylene overwrap.

The package overwrap material of the invention comprising the printed metallized PET film with a registered heat seal layer may also be used in conventional cigarette cartoning apparatus to overwrap conventional paperboard cartons of cigarette packages. Such a carton overwrap is especially advantageous in the case of the manufacture of cigarettes for export and is a substantial improvement over the OPP carton overwrap conventionally used for export product. If the cigarette carton is overwrapped with the metallized PET film of the invention, it is not essential that the individual cigarette packages in the carton be overwrapped with the same metallized PET film in order to achieve the extended shelf life provided by the invention.

It may be advantageous from the standpoint of reducing possible littering to seal the overwrap of the invention or portions thereof to the underlying paper (soft pack) or paperboard (hard pack) cigarette package so that the overwrap is not readily removable from the underlying package. If the overwrap is not heat sealed to, but is removable from the underlying cigarette package, it is preferably that the underlying paper or paperboard package be printed with the identical design and matter as the overwrap so that the package retains cigarette brand identification even when the overwrap has been removed and discarded.

It is a particular advantage of the present invention that the polyester film overwrap has greater tear strength and puncture resistance than the conventional OPP film overwrap. In addition, the presence of the metallized layer on the PET film overwrap advantageously provides a package with a metallic luster or sheen which significantly enhances the appearance and perception of quality of the packaged product.

According to another embodiment of the invention, the metallized PET film with a heat seal layer applied in a predetermined pattern is used as an inner liner instead of the metal foil/paper laminate used as an inner liner in a conventional cigarette package. In this embodiment, the metallized layer would not ordinarily be printed although it is contemplated, that the side edge of the metallized PET film that corresponds to the exposed top folded flap of the inner liner could be printed, for example, with a transparent ink or with other printed indicia. According to this further embodiment, the outer wrap and the overwrap may both be conventional, i.e., a printed paper outer wrap and a clear OPP heat sealed overwrap with a tear tape.

According to another feature of the present invention, an aromatic substance or other material which releases an aroma may be incorporated in or applied to one of the components of the package inside the metallized PET film overwrap or in the cigarettes, cigarette filter or even the tobacco. As used herein, an aromatic substance is defined as any substance having an aroma, fragrance, scent or the like. The high barrier characteristics of the overwrap advantageously allow the overwrap to retain the aroma or fragrance within the overwrap and to release the same when the tear tape is used to rupture the overwrap. The aromatic substance may be incorporated in the package in many ways. For example, the natural aroma of the tobacco may be enhanced by the addition to the tobacco itself of various aromatic substances, such as menthol oil or various tobacco extracts. The cigarettes, including the cigarette wrapping paper and the cigarette filter components, may have an aromatic substance incorporated therein as a separate element or as a coating or partial coating applied during manufacture of the cigarettes. Similarly, the inner foil wrap or the outer label wrap may have an aromatic substance incorporated therein as a separate element or as a coating or partial coating applied to the wrap substrates during manufacture of the wrap, or preferably during the packaging process. Regardless of the manner in which the aromatic substance is incorporated within the overwrap, it is advantageously retained within the package by the high barrier overwrap until the tear tape is used to rupture the overwrap. Upon rupture, the aroma or fragrance contained within the overwrap is released and provides a distinctly pleasant olfactory sensation to persons in the vicinity of the opened package.

With the foregoing and other advantages and features of the invention that will become hereinafter apparent, the nature of the invention may be more clearly understood by reference to the following detailed description of the invention, the appended claims and to the several views illustrated in the attached drawings.

DETAILED DESCRIPTION OF PREFERRED EMBODIMENTS

Figure 1:
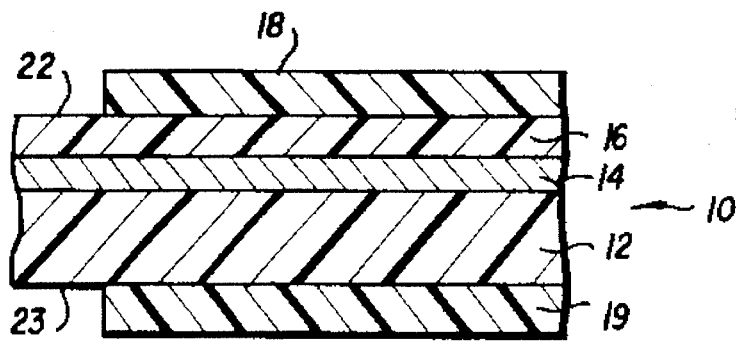
FIG. 1 is a partial cross-sectional view of the barrier overwrap material of the present invention.

Referring now to the drawings, FIG. 1 illustrates a partial cross-section of the barrier material used to form the overwrap of a cigarette package according to the invention which is designated by referenced numeral 10. The overwrap 10 comprises a polyester film substrate layer 12, preferably a biaxially oriented, heat stabilized polyethylene terephthalate (PET) single layer or multilayer film having a thickness ranging from about 0.25 mils to about 1.25 mils and preferably 0.48 or 0.60 mils. The polyester film layer 12 may have a glossy or a matte finish as is conventional in the art.

A metal layer 14 is disposed on one surface of the layer 12 and is applied thereto by a conventional vacuum deposition process preferably to an optical density of about 1.5 to about 3.0. The vacuum deposition technique can be used to coat or metallize a film with a variety of metals such as zinc, nickel, silver, copper, gold, indium, tin, stainless steel, chromium, titanium or aluminum. An aluminum coating is preferred according to the present invention.

PET films suitable for use in the present invention are commercially available from a number of sources, such as ICI Americas Inc., Film Drive, Wilmington, Del. 19897, American Hoechst Corporation, Greer, S.C. 29652, BCF-Bemis Converter Films, Oshkosh, Wis. 54903, E. I. DuPont de Nemours & Company, 1007 Market Street, Wilmington, Del. 19898, and Sumitomo Corporation of America, 611 S. Myrtle Avenue, Clearwater, Fla. 34616. Vacuum metallization of the films useful in the invention can be performed by a number of companies, such as Camvac Intl., Inc., Morristown, Tenn. 37814, Vacumet Corporation, 20 Edison Drive, Wayne, N.J. 07470. The films may be metallized with a shiny, highly reflective surface or with a satin-like, low-reflectance surface depending on whether the polyester film substrate had a glossy or a matte finish prior to metallizing. Films with both types of surfaces are useful in making packages according to the present invention.

The metallized PET film is imprinted on either surface thereof with a printing layer 16 which may include both transparent and opaque inks applied to the film with conventional rotogravure or flexographic printing techniques. Suitable inks include those made by Converters Ink Company, 1301 S. Park Avenue, Linden, N.J. 07036 under the designations Versaflex, Tem-Pro-Flex and Polestrin. When aluminum metallized PET film is used as an overwrap in the packaging of cigarettes according to the invention, it is advantageous to leave selected areas of the film unprinted so that such areas retain an aluminum foil-like appearance common in many cigarette packages. Such areas may include the top and bottom folded flaps of the overwrap. In this way, the cigarette package of the invention has an appearance comparable to conventional cigarette packages.

Layers 18 and 19 are fusion heat sealable layers composed of a thermoplastic polymer having a minimum sealing temperature in the range of 195° F. to 275° F. "Fusion heat sealable layer" is defined as a layer that forms a fusion heat seal to itself upon the application of heat above the minimum sealing temperature and upon the application of pressure of a given amount for a given dwell time as is well known and understood by those skilled in the art. Layers 18 and 19 have coating application weight range from about 1.0 to about 6.0 pounds per 3000 square feet, preferably between about 1.0 and 3.0 pounds per 3000 square feet, and may be composed of any fusion heat sealable material known to those skilled in the art, such as ethylvinyl acetate copolymers, vinyls, ionomers, or modified polypropylenes and preferably polyesters. The layers 18 and 19 are applied to one or both sides of the barrier film in a predetermined pattern and in registry with the printed layer 16.

Figure 2:
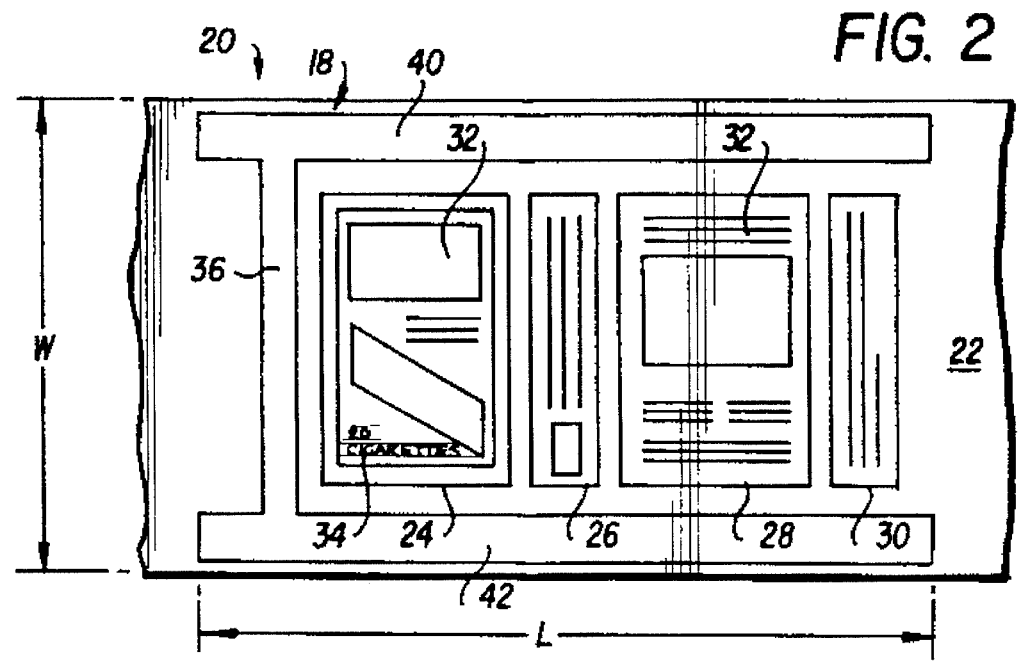
FIG. 2 is a plan view of one side of a portion of a strip of the barrier overwrap material showing one preferred pattern of the registered heat seal layer on said one side.
Figure 3:
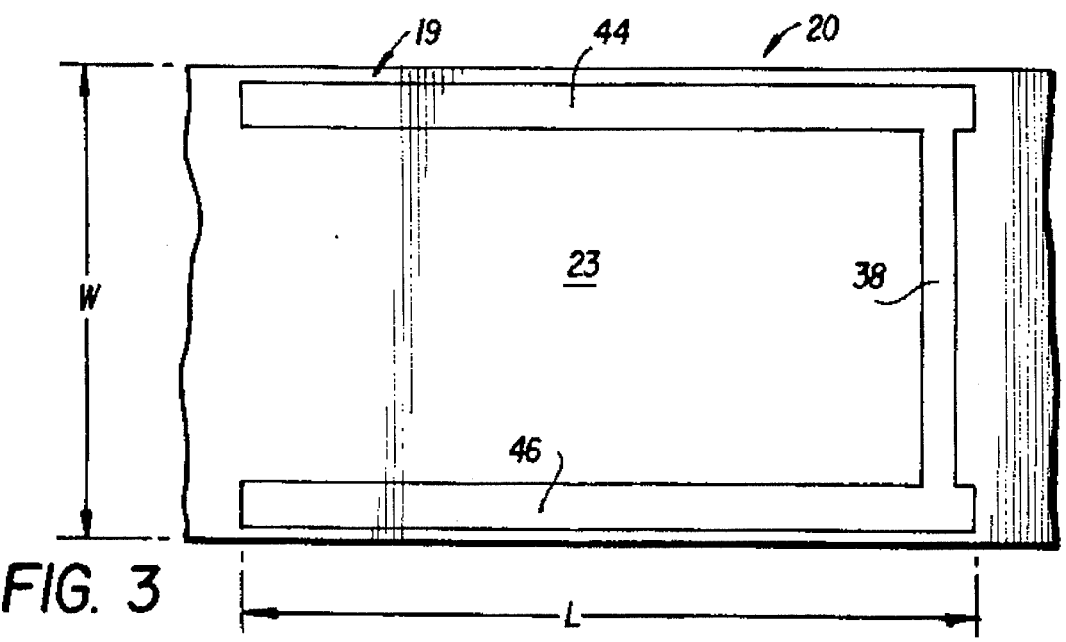
FIG. 3 is a plan view of the other side of the strip of barrier overwrap material of FIG. 2 showing the preferred heat seal layer pattern on said other side.

FIGS. 2 and 3 illustrate the opposite sides of a portion of a web 20 of the printed metallized PET film 10 of FIG. 1. FIG. 2 shows the top surface 22 or the outer, printed side of the web 20 and FIG. 3 shows the bottom surface 23 which is the PET film side of the web directly opposite the side shown in FIG. 2. The material web of FIGS. 2 and 3 is supplied to the cigarette packaging apparatus from a roll of material having a width W in the same way that conventional OPP overwrap film is supplied to the cigarette packaging apparatus.

Referring now to FIG. 2, the top aluminum metallized surface 22 of web 20 may be printed over its entire surface or only a portion thereof, for example, with a yellow transparent ink. When printed with yellow transparent ink, the printed surface 22 will be a golden color having either a shiny or a satin-like appearance depending on whether the underlying PET film has a glossy finish or a matte finish. Other colors of transparent printing inks may be printed on the aluminum metallized surface 22 to yield a variety of glossy or satin-like metallic finishes on the barrier material. For example, four areas 24,26,28, 30 on the surface 22 correspond to the respective sides, front and back walls of the rectangular parallelepiped cigarette package and may be imprinted with transparent or opaque inks with appropriate designs 32, printed matter 34 or other information. The bottom surface 23 of the web 20 as shown in FIG. 3 is the interior surface of the barrier overwrap and is preferably not printed.

After imprinting of the layer 16 onto the surface of aluminum metallized layer 14, the fusion heat sealable layers 18,19 are applied in predetermined patterns in registry with the printed surface 16 by a conventional printing process, e.g., a rotogravure roller. For sealing the longitudinal side seam of the package overwrap, transverse strips 36,38 of the fusion heat sealable layers 18,19 are applied to the top and bottom surfaces 22,23, respectively, of the web 20. When an appropriate length L of the web 20 is cut to form an overwrap for an individual cigarette package, the strips 36,38 are positioned to overlie one another for heat sealing. Similarly, the edge patterns 40,42 of the heat sealable layer 18 on the surface 22 and the edge patterns 44,46 of the heat sealable layer 19 on the surface 23 are optimally arranged for heat sealing the top and bottom folded slaps of the overwrap. The region of the top or outer surface 22 of the overwrap between the heat seal edge patterns 40,42 are advantageously not coated with a heat sealable layer so as to retain the slip characteristics of the printed metallized layer of the overwrap. Although the bottom or inner surface 23 of the overwrap is provided with the heat sealable layer 19 in a predetermined pattern, the heat sealable layer could be applied to the entire bottom or inner surface 23 of the overwrap web 20 since the slip characteristics of that surface are not critical.

Figure 4:
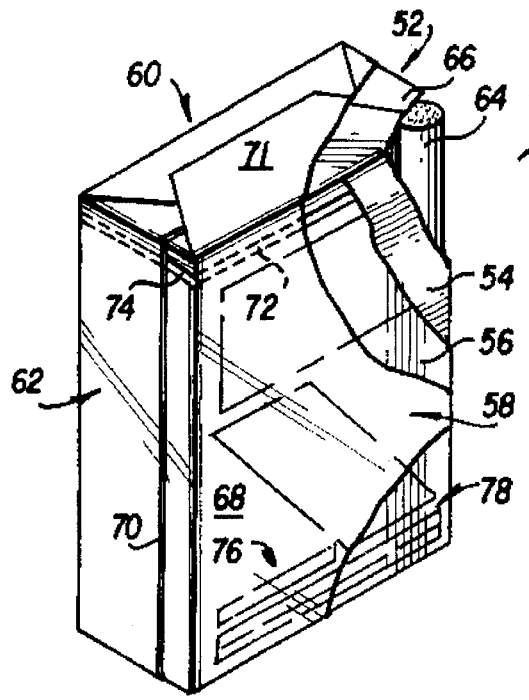
FIG. 4 is a perspective view, partly broken, of a first embodiment of a high barrier cigarette package according to the present invention.

Referring to FIG. 4, a first embodiment of the cigarette package according to the invention is designated generally by reference numeral 50. Package 50 is a "soft pack" and comprises a soft container 52 which typically contains twenty cigarettes 64 arranged in a 7-6-7 matrix within the container. The container 52 typically includes an inner wrap 54 and an outer printed or label wrap 56. A preferred inner wrap 54 is a metal foil/paper laminate, such as aluminum foil adhesively bonded to 28 pound bond paper. The outer label wrap 56 is preferably a paper material, such as clay coated 44 pound litho sheet and includes printed indicia (e.g., designs, graphics, brand specific information, etc.) positioned to be located on a specific wall surface of the package and corresponding with the printed indicia on the overwrap material. The package 50 shown in FIG. 4 has a front wall 58, a top wall 60 and a side wall 62. Not shown in FIG. 4 are the back wall opposite front wall 58, the bottom wall opposite top wall 60, and the side wall opposite side wall 62. An example of a soft container for cigarettes is disclosed in U.S. Pat. No. 3,695,422, the disclosure of which is incorporated herein by reference.

The inner wrap laminate 54 is folded into a six-sided rectangular parallelepiped to contain the cigarettes 64 in such a way that the paper side of the laminate is on the inner side of the container confronting the cigarettes 64. The outer label wrap 56 is folded so as to cover the front, back, bottom, and two side walls of the inner wrap leaving the top folded wall 66 of the inner wrap 54 uncovered by the outer wrap 56. Typically, an adhesive is applied to the outer label wrap 56 at the bottom and at the longitudinal side seam (not shown) to hold the wrap in place. The inner wrap 54, the outer label wrap 56 or the cigarettes 64 may be provided as described above with an aromatic substance.

The soft container 52 is provided with a high barrier overwrap 68 cut from the web 20 shown in FIGS. 2 and 3. The overwrap 68 is wrapped about the front, back, and side walls of soft container 52 and heat sealed along longitudinal side seam 70 where fusion heat sealable strips 36,38 (FIGS. 2 and 3) overlie one another. The top and bottom flaps of the overwrap are folded over in the same way as a conventional OPP overwrap and are heat sealed together along overlapping top flap or seam 71 and the corresponding flap/seam (not shown) on the bottom of the package.

A tear tape 72 for slitting the overwrap 68 is interposed between the outer label wrap 56 and the overwrap 68 of the package so as to circumscribe the soft container 52. A free end 74 of the tear tape 72 protrudes from beneath the overwrap 68 at the heat sealed longitudinal seam 70 and functions as a tab for the smoker to grasp and tear away the heat sealed top of the overwrap 68. If an aromatic substance has been applied to any of the internal components of the package as described above, the aroma will be emitted from the now-opened package to enhance the user's perception of the product.

It will be appreciated that to form a substantially impervious high barrier seal, the top and bottom folded end flaps or seams and the longitudinal side seam include heat seals between the heat seal layers 18 and 19, as well as heat seals between a portion of heat seal layer 18 to another portion of heat seal layer 18 and heat seals between a portion of heat seal layer 19 and another portion of heat seal layer 19. The manner in which the heat seal layers 18,19 of the overwrap 68 are sealed together corresponds generally to that described in U.S. Pat. No. 4,807,745 which is incorporated herein by reference.

Heat sealing is preferably performed in the conventional manner by application of heat to the fully folded overwrap at the top and bottom of the package. The thinner gauge of the metallized PET overwrap (48 to 60 gauge) compared to the conventional OPP overwrap (80 gauge), the greater heat conductivity of the metallized PET overwrap resulting from the metal layer 14 (FIG. 1), and the higher melting and thermal distortion temperature of the polyester film, provides greater flexibility in the selection of the heat sealing temperature, sealing pressure and dwell time, permitting production of high quality packages at high packaging speeds (in excess of 400 packages per minute).

The overwrap 68 of the package 50 of the present invention is designed to be used in conventional soft pack overwrapping apparatus, such as Model No. 716 from Scandia Packing Machinery, Clifton, N.J. or a Model 4350 Packager manufactured by G. D. Societa per Azioni, Bologna, Italy. Such apparatus is capable of providing the container 52 with the circumscribing heat sealed overwrap 68 and a tear tape 72 as will be apparent to the skilled artisan.

Referring again to FIG. 4, cigarette package 50 is preferably constructed so that the outer label wrap 56 and the overwrap 68 are aligned to provide substantial registration of the printed matter on the surfaces of the outer label wrap 56 and the overwrap 68 as shown, for example, in FIG. 4 by the printed matter 76 on the overwrap 68 and the printed matter 78 on the outer label wrap 56. Thus, when all or a portion of the overwrap 68 is removed from the underlying container 52, the location of the printing which appears on the outer label wrap substantially matches the location of the printing on the overwrap.

Figure 5:
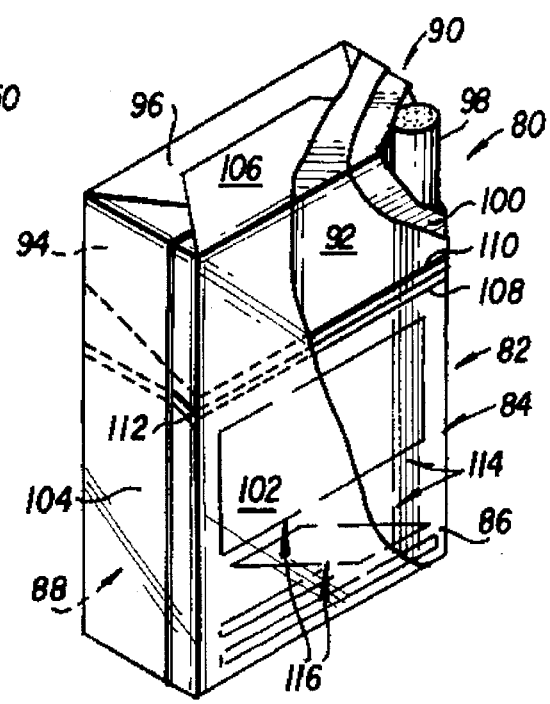
FIG. 5 is a perspective view, partly broken, of a second embodiment of a high barrier cigarette package according to the present invention.

Now referring to FIG. 5, another embodiment of the cigarette package according to the invention is designated generally by reference numeral 80. Package 80 is a "hard pack" or "crush proof box" and comprises a hinged lid container 82 which is typically manufactured from a resilient paperboard material. An example of a preferred paperboard is a low density, solid bleached sulfate paperboard having a thickness of about 0.012 inch. Examples of suitable hinged lid containers are described in U.S. Pat. Nos. 3,874,581; 3,858,788; 3,944,066; and 4,852,734, among others.

The container 82 includes a body portion 84 having a front wall 86 and a side wall 88. The body portion 84 also has a bottom wall, a side wall opposite side wall 88 and a rear wall opposite front wall 86 which are not shown in FIG. 5. The container 82 also include a lid portion 90 integrally hinged to the rear wall of the body portion 84. The lid portion 90 has a front wall 92, side wall 94, and top wall 96 shown in FIG. 5 and a side wall and rear wall not shown, but located opposite the side wall 94 and front wall 92, respectively.

The container 82 typically contains twenty cigarettes 98 arranged in a 7-7-6 matrix within the container. Normally, the cigarettes 98 are disposed in a metal foil/paper laminate inner liner (not shown) with a corresponding metal foil/paper laminate pull tab 100 positioned over the upper ends of the cigarettes beneath the top wall 96 of the hinged lid 90. When the lid portion 90 of the container 82 is pivoted open and the pull tab 100 is removed, the upper ends of the cigarettes 98 are exposed to view. The package 80 may also have incorporated therein an aromatic substance as described above.

The hinged lid container 82 is provided with a high barrier overwrap 102 cut from the web 20 shown in FIGS. 2 and 3. The overwrap 102 is wrapped about the front, rear, and side walls of the body and lid portions 84, 90 of the container 82 and heat sealed along longitudinal side seam 104 where fusion heat sealable strips 36, 38 (FIGS. 2 and 3) overlie one another. The top and bottom flaps of the overwrap 102 are folded over in the same way as a conventional OPP overwrap and are heat sealed together along overlapping top flap or seam 106 and bottom flap/seam (not shown).

A tear tape 108 for slitting the overwrap 102 is interposed between the body portion 84 and the overwrap 102 of the package so as to circumscribe the container at a point just below the lower edge 110 of the front wall 92 of the lid portion 90. A free end 112 of the tear tape 108 protrudes from beneath the overwrap 102 at the heat sealed longitudinal seam 104 and functions as a tab for the smoker to grasp and tear away that portion of the overwrap covering the lid portion 90 of the container 82.

Heat sealing of the package 80 of FIG. 5 is accomplished in a manner similar to that described above in connection with the package 50 of FIG. 4.

The overwrap 102 of the package 80 of the present invention is designed to be used in conventional hard pack overwrapping apparatus, such as the Model No. 716 Scandia apparatus or the Model 4350 G.D. apparatus. Such apparatus is capable of providing the container 80 with the circumscribing heat seat overwrap 102 and a tear tape 108 as will be apparent to the skilled artisan.

In the same manner that the package 50 of FIG. 4 is designed, cigarette package 80 is designed so that the printed matter 114 on the container 82 and the printed matter 116 on the overwrap 102 are aligned with each other.

Figure 6:
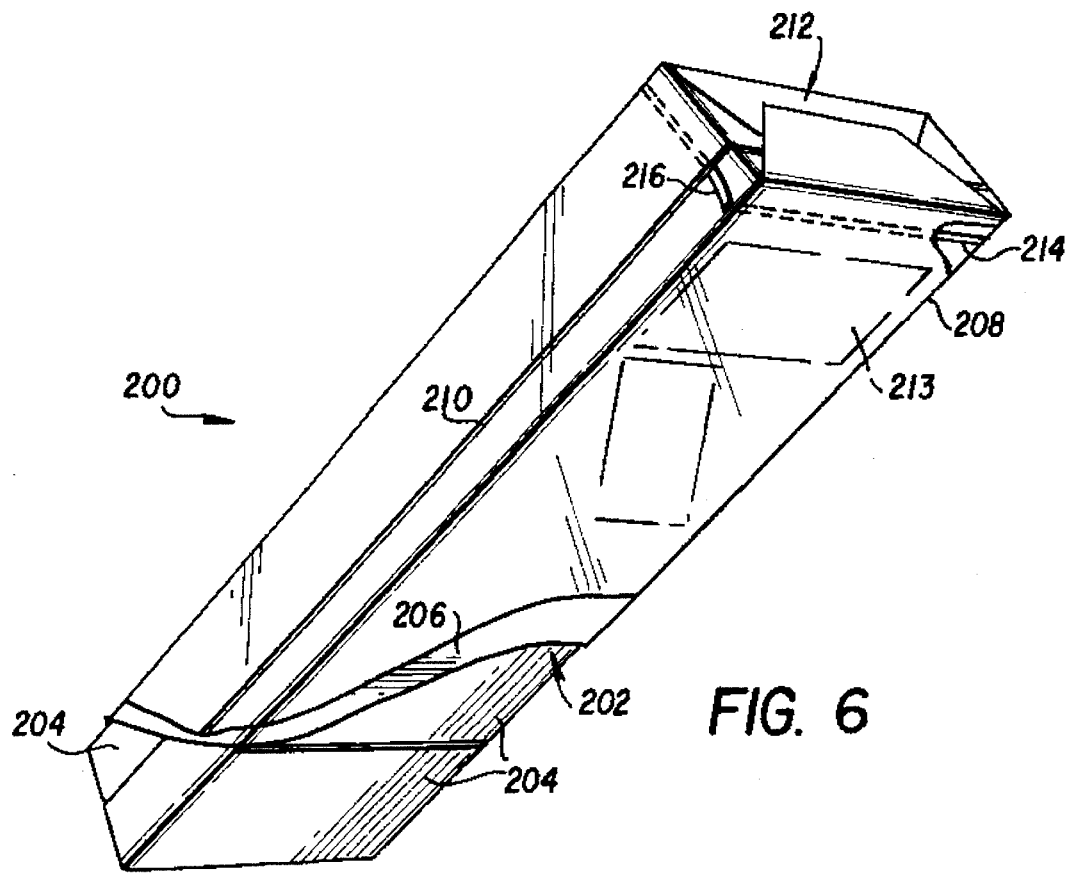
FIG. 6 is a perspective view, partly broken, of a high barrier cigarette carton according to the present invention.

FIG. 6 illustrates an embodiment of an overwrapped carton of cigarette packages according to the invention which is designated generally by reference numeral 200. Overwrapped carton 200 comprises a rectangular parallelepiped carton 202 having front and rear walls, two side walls and two ends and preferably is manufactured from a paperboard material. A plurality of cigarette packages 204 are packed in carton 202. In the embodiment shown, carton 202 contains ten individual packages of cigarettes packed in two rows of five each although it should be understood that other carton sizes and packing arrangements with a greater or lesser number of packages are also contemplated by the invention. One side wall 206 of the carton 202 comprises a double-walled folded flap which may be loosely tacked together with an adhesive in a conventional manner.

The carton 202 is provided with a high barrier overwrap 208 made from a web of material similar to that shown in FIGS. 1–3. The overwrap 208 is wrapped about the front, rear and side walls of the carton 202 and heat sealed along a longitudinal seam 210. The open ends of the carton overwrap 208 are folded over the ends of the carton 202 in the same way as a conventional OPP package overwrap and are then heat sealed together along overlapping top flap or seam 212 and bottom flap/seam (not shown). The overwrap 208 may be provided with a design 213 or other printed indicia. As in the previously described embodiments, the printed matter 213 may be in registry with printed matter (not shown) on the carton 208.

A tear tape 214 for slitting the overwrap 208 is interposed between the carton 202 and the overwrap 208 so as to circumscribe the carton walls adjacent the top end of the carton. A free end 216 of the tear tape 214 protrudes from beneath the overwrap 208 at the heat sealed longitudinal seam 210 and functions as a tab for the consumer to grasp and tear away the top end flap 212 and expose the end of the carton.

Heat sealing of the carton overwrap 208 of FIG. 6 is accomplished in a manner similar to that described above in connection with the package 50 of FIG. 4. The overwrapped carton 200 may also have an aromatic substance incorporated therein as described above in connection with the embodiments of FIGS. 4 and 5.

EXAMPLE

Barrier overwrap materials were prepared according to the following procedure:

Polyester single layer and coextruded multilayer polyester oriented (PET) films having high gloss, low haze, and good handling properties in 48 and 60 gauge thicknesses were obtained from ICI Americas Inc. The films are sold under the designations Melinex 800, Melinex 850 and Melinex 851. The PET films were vacuum metallized with aluminum according to conventional processes by Camvac Intl. Inc. and Vacumet Corporation to optical densities of 2.0. The films were then printed on both the metallized and unmetallized surfaces by conventional rotogravure printing techniques using the following rotogravure printing inks: Versaflex GP-4252 and GP-4253; Tem-Pro-Flex CP-116997, CP-116974, CP-116971, CP-116998, CP-116973, and CP-116512 each with extender CP-116484; and Polestrin CP-116981 with extender V-91511 all manufactured by Converters Ink Company.

A heat seal layer consisting of a modified polyester, Designation Number 9762-001, available from the Valspar Corporation, 2000 Westhall Street, Pittsburgh, Pa. 15233 was applied to the printed metallized PET film also by conventional roto gravure techniques with a cylinder etched to deliver an application weight of 1.0 lbs/ream. The modified polyester coating is highly transparent and has a coefficient of friction of between 0.15 and 0.30. The heat seal coating was tested by application in three different ways and used to overwrap soft pack cigarette packages in conventional overwrapping apparatus made by G. D. Societa per Azioni and Scandia. In the first test, the heat seal layer was applied as an overall coating to the entire inner unmetallized surface of the package overwrap. The printed design was register-applied to the outer metallized surface of the overwrap with a subsequently register-applied heat seal layer in the regions identified by reference numerals 36, 40, 42 on FIG. 2 where an out-to-out or an in-to-out seal would be required during the flap folding and sealing process. In the second test, the heat seal layer was applied as an overall coating on the metallized surface of a coextruded multilayer PET film (ICI Melinex 850 and 851) which was used as the inside surface of the package overwrap. The printed design was applied to the unmetallized side of the overwrap film. During the heat seal process, the multilayer PET film overwrap was folded and its outer surface was sealed to itself or to the inner heat seal layer. In the third test, the heat seal layer was register-applied to the inner layer in the regions identified by reference numerals 38, 44, 46 on FIG. 3. The outer surface was register printed with the heat seal layer applied in the regions identified by reference numerals 36, 40, 42 on FIG. 2 where an out-to-out or in-to-out seal would be required during the folding and sealing process.

Each of the three test films were slit into widths appropriate for the cigarette package overwrapping machinery and wound onto rolls for use in overwrapping conventional soft packs. The overwrap equipment utilized is capable of overwrapping cigarette packages with conventional OPP overwrap at rates up to 500 packages per minute. A rate of 470 packages per minute was experimentally achieved with the three test overwraps on the GD overwrapping apparatus. Comparative moisture and oxygen barrier tests on the metallized PET overwrap film of the invention compared with a conventional 80 gauge OPP overwrap gave the following results:

TABLE 1

|  | Moisture Transmission (gms/100 in²/24 hr.) at 100° F. 90% RH | Oxygen Transmission (cc/100 in²/24 hr.) at 73° F. 0% RH |
| --- | --- | --- |
| 48 ga. metallized PET | 0.038 | 0.1 |
| 80 ga. OPP | 0.516 | 113.0 |

A standard shelf life study was conducted to determine the moisture loss (or gain) over time of the tobacco of cigarettes packaged in three types of packages, namely, unwrapped standard cartons, standard cartons overwrapped with 80 gauge OPP and standard cartons overwrapped with metallized PET (MPET) according to this invention. All standard cartons contained cigarette packages overwrapped with 80 gauge OPP. Sample cartons for the shelf life study were selected from a plurality of standard cartons manufactured at the same time to insure that all sample cartons had the same initial moisture content. Some of the sample cartons were overwrapped with 80 gauge OPP, some were overwrapped with MPET and some were not overwrapped (i.e., unwrapped). To establish the initial moisture content of the cigarette tobacco packaged in the sample cartons, tobacco from one of the sample cartons was removed from the cigarettes in that carton and the actual moisture content of the tobacco as a percentage of total tobacco weight was determined according to standard procedure. That value of actual moisture content represented the initial moisture content of the tobacco in all sample cartons. The sample cartons were weighed to determine the initial weight for each carton at the initial moisture content. The cartons were then divided into three groups, each group including cartons of each type, i.e., unwrapped, 80 ga. OPP overwrap and MPET overwrap. Each group of the three carton types was placed in one of three different controlled environments of a given temperature (T) and relative humidity (RH). Periodically, the cartons of each group were weighed and, based on the initial moisture content and the difference in weight from the initial weight of each sample carton, the moisture content of the tobacco in each carton was calculated. The average moisture content of the sample cartons of each type after seven (7) weeks is presented in Table 2 below.

TABLE 2

|  | INITIAL MOISTURE | MOISTURE CONTENT % AT 7 WEEKS | | |
| --- | --- | --- | --- | --- |
| T °F./ RH % | CONTENT % | Std Carton Unwrapped | Std Carton 80 ga. OPP | Std Carton MPET |
| 93/20 | 12.3 | 7.4 | 9.9 | 11.9 |
| 76/34 | 12.3 | 11.0 | 11.8 | 12.2 |
| 88/80 | 12.3 | 14.2 | 12.9 | 12.3 |

While the barrier packaging material of the present invention has been illustrated and described herein as an overwrap for packages and cartons of smoking articles, it is also possible to use the packaging material of the invention as an inner liner or inner wrap in lieu of the conventional metal foil/paper laminate. When used as an inner wrap, the packaging material of the invention need not be printed and may have a heat seal layer applied to one or both entire sides thereof. The outer label wrap may be a conventional soft or hard pack container and the overwrap may be a conventional optically clear OPP heat sealable overwrap with a tear tape.

Referring to FIG. 4, this alternate embodiment includes: (1) an inner liner 54 comprising a metallized PET film, printed or unprinted, with a heat seal layer or layers for heat sealing the folded top wall or flap 66 and the bottom wall or flap (not shown); (2) an outer label 56 of paper with printed indicia; and (3) an overwrap 68 of an optically clear polymeric material, such as heat sealable OPP. A tear tape similar to the tear tape 72 is arranged on the inner liner 54 for slitting the metallized PET film of the inner liner of this alternate embodiment.

In this alternate embodiment, since the barrier properties are provided by the heat sealed inner liner, the heat seal characteristics of the overwrap are not as critical as in a conventional cigarette package. Accordingly, the slip characteristics of the overwrap may be substantially improved with no sacrifice of barrier properties of the overall package.

The packaging material of the invention could also be used as the outer label wrap printed with appropriate indicia and with heat seal layers on one or both sides thereof. The inner wrap may be a conventional metal foil/paper laminate and the overwrap may be a conventional optically clear OPP heat sealable overwrap with a tear tape. It is also possible to use only the metallized PET packaging material to package the smoking articles so long as the package or its contents provides sufficient support for forming the heat seals along the seams/flaps of the package.

Although certain presently preferred embodiments of the invention have been specifically illustrated and described herein, it will be appreciated by those skilled in the art to which the invention pertains that many modifications and variations of the present invention are possible in light of the above teachings without departing from the spirit and scope of the invention. Accordingly, it is intended that the invention be limited only to the extent required by the appended claims and the applicable rules of law.

What is claimed is:

1. A barrier package for smoking articles comprising:
   an inner wrap containing a plurality of smoking articles; and
   an overwrap film formed separately from the inner wrap and overwrapped separately about the inner wrap to form the outermost wrap of the package, said overwrap film comprising a polymeric film having a vacuum deposited metal layer on one side thereof, said overwrap film being sealed to form said barrier package, said overwrap film having inner and outer surfaces and being sealed by a heat sealable layer applied to the inner and outer surfaces of said overwrap film.

2. The package of claim 1, wherein said heat sealable layer on the outer surface of said overwrap film is applied in a predetermined pattern.

3. The package of claim 2, wherein said heat sealable layer on the inner surface of said overwrap film is applied in a predetermined pattern.

4. The package of claim 1, wherein said inner wrap comprises a hinged lid container.

5. The package of claim 1, wherein said smoking articles are cigarettes.

6. The package of claim 1, wherein said overwrap film is heat sealed.

7. The package of claim 1, including an aromatic substance applied to the inner wrap.

8. The package of claim 1, including a tear tape interposed between the inner wrap and the overwrap film for removing at least a portion of the overwrap film from the package to provide access to the inner wrap.

9. The package of claim 1, wherein said polymeric film is a biaxially oriented polyethylene terephthalate film having a vacuum deposited aluminum layer on one side thereof.

10. The package of claim 1, wherein said polymeric film is a film from the group consisting of polyethylene terephthalate film, polypropylene film and nylon film.

11. The package of claim 1, wherein said overwrap film has a thickness of about 1.25 mils or less.

12. The package of claim 1, wherein said overwrap film has a thickness of about 0.25 to about 1.25 mils.

13. The package of claim 1, wherein said overwrap film has a thickness less than about 80 gauge.

14. The package of claim 1, wherein said overwrap film has a thickness of about 48–60 gauge.

15. A barrier package for smoking articles comprising:

an inner wrap containing a plurality of smoking articles; and an overwrap film overwrapping the inner wrap to form the outermost wrap of the package, said overwrap film having an overlapping heat sealed side seam and overlapping top and bottom folded and heat sealed end flaps, said overwrap film comprising a polymeric film with a vacuum deposited metal layer on one side thereof, a heat sealable layer applied to both inner and outer surfaces of the overwrap film, the layer applied to the outer surface of the overwrap film being applied in a predetermined pattern including longitudinal strips along the top and bottom edges of the film which cooperate with the sealable layer on the inner surface of the overwrap film to form the folded and heat sealed end flaps of the package and a transverse strip extending between the longitudinal strips along the edges of the overwrap film which cooperates with the sealable layer on the inner surface of the overwrap film to form the heat sealed side seam of the package.

16. The package of claim 15, wherein an aromatic substance is applied to the inner wrap.

17. A barrier package for cigarettes comprising:

an inner wrap containing a plurality of cigarettes; and an overwrap film formed separately from the inner wrap and overwrapped separately about the inner wrap to form the outermost wrap of the package, said overwrap film comprising a biaxially oriented polyethylene terephthalate film having a vacuum deposited aluminum layer on one side thereof and heat sealable layers on both sides thereof, said heat sealable layers being heat sealed together to form said barrier package.

18. The package of claim 17, wherein said overwrap film has a thickness of about 0.25 mils to about 1.25 mils.

19. The package of claim 17, wherein said overwrap film has a thickness of about 1.25 mils or less.

20. The package of claim 17, wherein said heat sealable layers on the inner and outer surfaces of said overwrap film are applied in predetermined patterns.

* * * * *